Oct. 28, 1930.  O. MICHALK  1,780,028
FORWARD AND REVERSE GEAR
Filed April 10, 1930   2 Sheets-Sheet 1
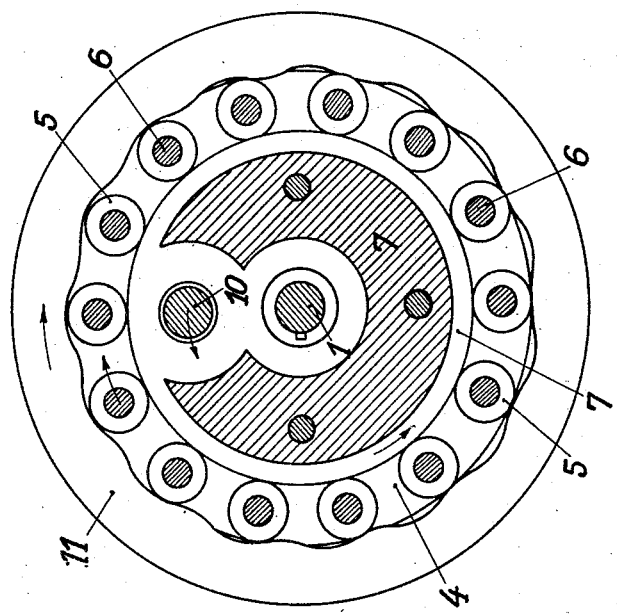
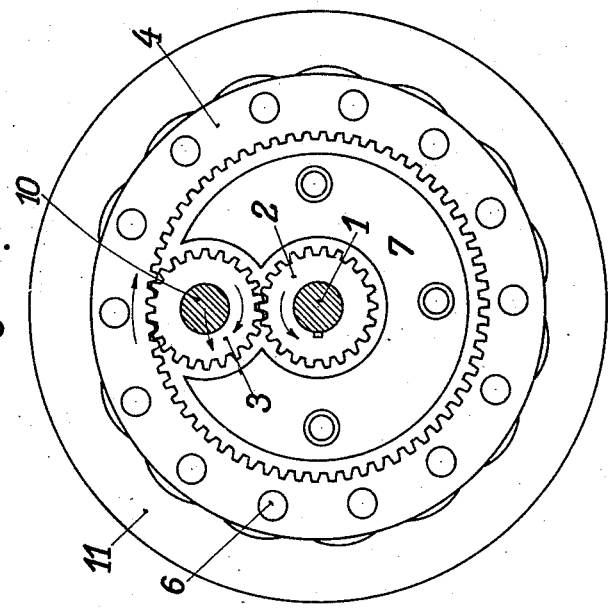
Inventor:
Otto Michalk

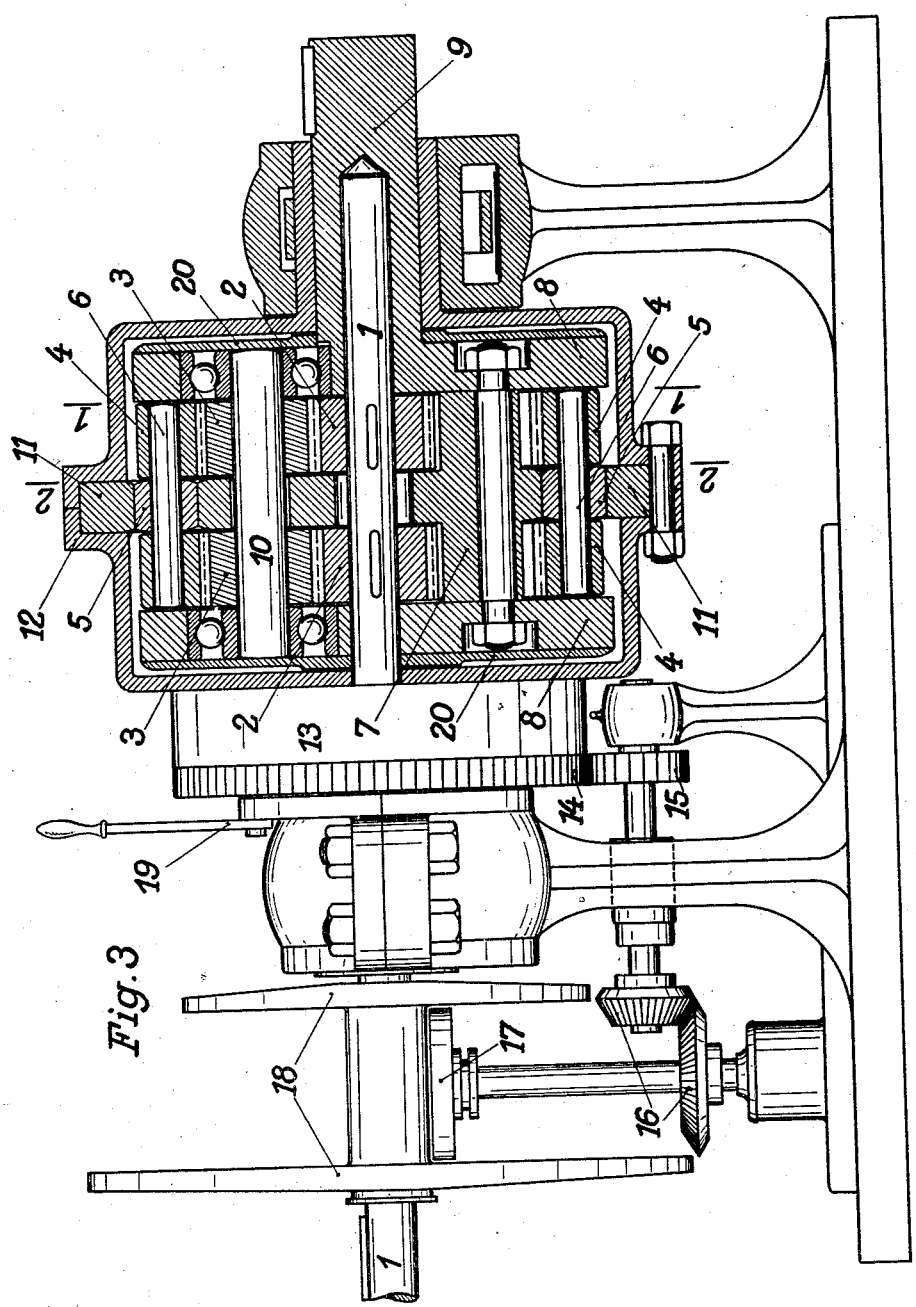

Patented Oct. 28, 1930

1,780,028

UNITED STATES PATENT OFFICE

OTTO MICHALK, OF FREITAL, NEAR DRESDEN, GERMANY

FORWARD AND REVERSE GEAR

Application filed April 10, 1930, Serial No. 443,199, and in Germany April 17, 1929.

The invention relates to a forward and reverse gear return motion and adapted to be regulated without gradation. There are gears known which work either with cog-wheels or in which rolls are acted upon by crank pins or eccentrics to roll in circular runs or runs composed of arcs. In gears of this type the power supplied is transmitted either by the motion of the rolls or, in case of an exclusively circular motion of the rolls, the curved rim is rotated to transmit the power indirectly. Moreover, in such gears the curved rim or the roll system can be idle, move or be braked completely, according to the desired drive, but in each instance a part of the power supplied is destroyed and the driven shaft never can be loaded higher. Compared with this type of gears the invention consists in providing a planet wheel system actuated by the driving shaft and rolling over one or several rims wherein rolls are disposed at a certain equal distance from one another and roll over an eccentric disc which presses them against a run consisting of curves, arcs or parts thereof and communicating with a regulating member, the eccentric disc being firmly connected also with the driven shaft and the regulating member permitting the run to cooperate in the motion. It is possible also to impart to the run suitable additional drive in the direction of rotation of the driving shaft to increase the speed of the driven member or in the direction opposite to the direction of rotation of the driving shaft to reduce or reverse the rotary motion of the driven member.

The regulating member may be a liquid regulator or any suitable braking device. Furthermore, the casing firmly connected with the run may be constructed as the armature of an electromagnet to insure electric fine adjustment. The eccentric disc is positioned only slightly eccentrically, and during its rotation caused by the planet wheels the rolls or rims are pressed against the run, and as soon as the run stops, the rims receive during their rolling motion a uniform rotary motion opposite to that of the eccentric disc. When the run is released and can cooperate in the motion, the rotary speed of the drive can be regulated according to the degree of speed at which the run cooperates in the motion. The extent of transmission depends on the number of rolls on the rims and on the number of arcs making up the run. The more the run or the casing wherein it is disposed is driven, the greater will be the speed of the driven member. If the run is driven in a direction opposite to that of the drive, the driven shaft will move back.

The invention affords the advantage of making use at the driven shaft of the full power supplied to the driving shaft. Unlike the known types of gears, the power is not partially destroyed, but at a lower speed of the driven shaft relative to that of the driving shaft a correspondingly greater power can be utilized.

One form of the invention is illustrated in the accompanying drawing, in which Figure 1 is a cross section on the line 1—1; Fig. 2, a cross section on the line 2—2, Fig. 3; and Fig. 3, a longitudinal section of the gear with a regulating device and a drive for the run.

Referring to the drawing, 1 is the driving shaft and 2 are the driving cog wheels arranged thereon and driving the cog wheels 3 rotatably disposed on a pin 10 which moves in ball bearings. The cog wheels 3 engage the rims 4 between which the rollers 5 are positioned on the bolts 6 which pass through the rims. There are for instance fourteen rollers 5. 7 is an eccentric disc, the center of which is arranged eccentrically relative to the center of the shaft 1, the disc surrounding loosely the shaft 1 and the pin 10 and being secured between the discs 8, one of which is firmly connected with the driven shaft 9. 11 is a run consisting of rims, arcs or parts thereof and secured in the casing 12. There are for instance fifteen curves in the rim. 13 is a liquid regulator rigidly secured to the casing 12. On the liquid regulator a rim 14 is positioned in mesh with a cog wheel 15 driven by the bevel wheels 16. One bevel wheel is arranged on a vertical shaft on which a friction disc 17 is slidingly disposed which works between the friction discs 18 which are capable of axial displacement. 19 is a lever for the regulating device, and 20 are the two covering plates on the discs 8.

The device functions as follows:

The driving shaft 1 drives the cog wheels 3 by means of the gears 2. If it be assumed for better understanding that the rims 4 stand still, the wheels 3, engaging the internal teeth 4, will rotate (see direction indicated by arrows) in the same direction as the shaft 1 but at a lower speed. As the pin 10 of the wheels 3 is arranged in the two discs 8, the latter will drive also the disc 7 eccentrically positioned between them and so the driven shaft 9. Owing to the rotation of the disc 7, the fourteen rollers 5 will be pressed against the fifteen curves of the run 11 and moves in the opposite direction on account of the wedge effect of the curves. As the rims 4 are permitted to cooperate in the motion, they will rotate in the direction indicated in Figs. 1 and 2 and the run 11 will be rotated in the same direction of the arrows. The run 11 can be stopped or released at will by the regulating device 13. If the run 11 stands completely still, the maximum speed according to pitch will be transmitted to the discs 7 and 8 and thus to the driven shaft. If the run 11 is permitted to move somewhat in the direction of motion of the rims 4, the forward motion of the gears 3 and thus that of the discs 7, 8 and of the driven shaft 9 will be reduced to the extent of the difference of the relative motion, and this can be continued until the discs 7 and 8 stand still. In this way gearing down can be effected. On the other hand, if the rotation of the run 11 is increased by a special drive such as the friction drive 17, 18, the shaft 9, which had come to a position of rest, begins to move backward; and if the run is driven from its position of rest, i. e., when the driven shaft 9 is at maximum speed, in the same direction as the driving shaft, the rotary speed of the driven member is increased and can be further increased at will.

I claim:—

1. A forward and reverse gear adapted to be regulated without gradation comprising a driving shaft, a planet wheel system driven by the said driving shaft, rims whereon the said planet wheels move, rolls equidistantly positioned between the said rims, an eccentric disc whereon the said rolls move, a run composed of curves, the said rolls being pressed against the said run by the said eccentric disc, a regulating member communicating with the said run, and a driven shaft connected with the said eccentric disc, the regulating member permitting the run to be moved at will.

2. In a gear according to claim 1 a run, and a driving device adapted to impart additional drive to the said run.

In testimony whereof I affix my signature.

OTTO MICHALK.